United States Patent
Zhang et al.

(10) Patent No.: US 12,439,114 B2
(45) Date of Patent: Oct. 7, 2025

(54) VIDEO SWITCHING METHOD AND RELATED DEVICE

(71) Applicant: Huawei Technologies Co., Ltd., Shenzhen (CN)

(72) Inventors: Zhenxing Zhang, Shenzhen (CN); Hua Long, Shenzhen (CN); Guang Qian, Shenzhen (CN); Junhao Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/361,469

(22) Filed: Jul. 28, 2023

(65) Prior Publication Data
US 2023/0370668 A1  Nov. 16, 2023

Related U.S. Application Data

(63) Continuation of application No. PCT/CN2021/074521, filed on Jan. 29, 2021.

(51) Int. Cl.
| | |
|---|---|
| G06F 3/00 | (2006.01) |
| G06F 13/00 | (2006.01) |
| H04N 5/445 | (2011.01) |
| H04N 21/239 | (2011.01) |
| H04N 21/266 | (2011.01) |
| H04N 21/472 | (2011.01) |

(52) U.S. Cl.
CPC ....... *H04N 21/266* (2013.01); *H04N 21/2393* (2013.01); *H04N 21/472* (2013.01)

(58) Field of Classification Search
CPC ............. H04N 21/266; H04N 21/2393; H04N 21/472; H04N 21/4402; H04N 21/44016; H04N 5/268; H04N 5/50; G09G 2310/06; G09G 2370/20; G09G 5/12

See application file for complete search history.

(56) References Cited

U.S. PATENT DOCUMENTS

| | | | | |
|---|---|---|---|---|
| 7,448,063 | B2 * | 11/2008 | Freeman | H04N 7/0882 348/E7.039 |
| 2006/0214950 | A1 * | 9/2006 | Hsieh | G06F 3/1446 345/634 |
| 2011/0292292 | A1 * | 12/2011 | Goel | H04N 21/44016 348/E5.057 |
| 2021/0204007 | A1 * | 7/2021 | Xiong | H04N 21/234 |

FOREIGN PATENT DOCUMENTS

| CN | 101854487 A | 10/2010 |
|---|---|---|

* cited by examiner

*Primary Examiner* — Gigi L Dubasky
(74) *Attorney, Agent, or Firm* — Slater Matsil, LLP

(57) ABSTRACT

Embodiments of this application disclose a video switching method and a related device, and are applied to the multimedia field. The method in embodiments of this application includes: A video transmit end receives a video switching instruction when sending a first video frame, where the first video frame is one frame of video data of a first video stream that is being sent by the video transmit end; and the video transmit end switches video data in response to the video switching instruction when a first field blanking period after the first video frame arrives. In embodiments of this application, a video data switching process of the video transmit end may be controlled to occur in the field blanking period, and the video transmit end always sends a complete video frame to a video receive end.

20 Claims, 5 Drawing Sheets

VIDEO SWITCHING METHOD AND RELATED DEVICE

CROSS-REFERENCE TO RELATED APPLICATIONS

This application is a continuation of International Application No. PCT/CN2021/074521, filed on Jan. 29, 2021, the disclosure of which is hereby incorporated by reference in its entirety.

TECHNICAL FIELD

Embodiments of this application relate to the multimedia field, and in particular, to a video switching method and a related device.

BACKGROUND

With development of information technologies, there are increasing high-speed media connection and playing scenarios. For example, a set-top box is connected to a television through a high-speed multimedia interface. The set-top box is configured to receive a digital signal, convert the digital signal into video data, and then transmit the video data to the television through a high-speed transmission line for display. In a process of displaying a video, a user may send video switching instructions such as an instruction for changing a program channel or changing video resolution based on a requirement. The set-top box may switch the video according to the instruction, and adjust an output of a video signal.

Currently, a common switching solution is as follows: After receiving a video switching instruction, a set-top box immediately disables a high-definition interface, stops sending original video data, and then configures a new video based on a video data parameter requirement in the instruction. After the new video data is ready, the high-definition interface is enabled again and the new video data is transmitted to a television for display.

A process of transmitting the video data is continuous, but a time at which a user sends a switching instruction is random, in other words, the set-top box disables the high-definition interface randomly. Therefore, data transmission is probably stopped when a middle part of a frame of video is transmitted. In this case, video data received by the television is not a complete frame of data. Consequently, a phenomenon such as screen tearing, screen flickering, or a snowflake screen occurs, and compatibility problems such as abnormal sound may occur.

SUMMARY

Embodiments of this application provide a video switching method and a related device, to avoid a phenomenon such as screen tearing at a video receive end. In addition, a video transmit end can complete video switching without stopping a video transmission process, thereby shortening a video switching time in a high-speed media interface transmission process.

A first aspect of embodiments of this application provides a video switching method, including:

A video transmit end transmits a first video stream to a video receive end. When a first video frame is transmitted, the video transmit end receives a video switching instruction, where the instruction instructs the video transmit end to switch to a new video stream, and transmits the new video stream to the video receive end. In this case, the video transmit end does not immediately perform switching, but waits for arrival of a first field blanking period after the first video frame, responds to the video switching instruction, starts a video switching procedure, and performs related data switching.

In the foregoing method, a video data switching process of the video transmit end occurs in the field blanking period, which can ensure that the video transmit end does not perform video switching in a video active period. In this way, video data transmission is not interrupted in the middle of the video frame, in other words, the video transmit end always sends a complete video frame to the video receive end. Therefore, the video receive end also displays the complete video frame, thereby avoiding a phenomenon such as screen tearing, screen flickering, or a snowflake screen.

In an optional implementation, the video data switching process of the video transmit end in the first field blanking period may be as follows: The video transmit end responds to the video switching instruction, switches from the first video stream to dummy data, and then starts to send the dummy data to the video receive end. When sending the dummy data, the video transmit end modifies a video source parameter based on video parameter indication information in the video switching instruction, to obtain the new video stream. Then, the video transmit end needs to wait for arrival of a field blanking period of the new video stream. When the field blanking period of the new video stream arrives, the transmitted dummy data is switched to the new video stream, and then the new video stream is sent to the video receive end in an active period after the field blanking period.

In the foregoing embodiment, when switching the video data, the video transmit end does not shuts down the video stream, but first switches the video stream to the dummy data for transmission, and then obtains, according to an indication in the video switching instruction during transmission of the dummy data, the new video stream that meets a requirement. Then, in the field blanking period of the new video stream, the dummy data is switched to the new video stream, and then the new video stream is transmitted. In this way, video switching can be completed under a condition that an original connection link does not change, and a video switching time is reduced. In addition, two times of data switching occur in the field blanking periods, which can ensure that the video transmit end sends the complete video frame to the video receive end. In this way, the streaming video receive end can be prevented from the phenomenon such as the screen tearing, the screen flickering, or the snowflake screen.

In an optional implementation, when sending the dummy data, the video transmit end further needs to perform hardware adaptation based on the video parameter indication information carried in the video switching instruction, for example, modify a hardware clock or modify traffic control information. In this way, effective transmission of the new video stream can be ensured, a probability of a compatibility problem is reduced, and transmission efficiency of the new video stream is improved.

In an optional implementation, before the video transmit end responds to the video switching instruction and after the video transmit end receives the video switching instruction, the video transmit end sends a switching request command to the video receive end, to notify the video transmit end that video switching is about to be performed. The switching request command may include the video parameter indication information and the like in the video switching instruction. In this way, the video receive end may perform preprocessing in advance based on the information in the switching request command. After a preprocessing procedure of the video receive end is completed, a first switching control instruction is fed back to the video transmit end, and the video transmit end is allowed to perform video switching. In this case, the video transmit end may respond to the first switching control instruction and start the video switching procedure.

In the foregoing embodiment, before starting the video switching procedure, the video transmit end needs to notify the video receive end, so that the video receive end can prepare in advance to receive the new video stream. This prevents display exceptions such as the screen tearing, the screen flickering, or the snowflake screen after the video receive end receives the new video stream without preparation, thereby making a system more stable.

In an optional implementation, transmission rates of the new second video stream and the original first video stream may be the same or different. When the transmission rates of the two video streams are different, the hardware adaptation is required to adapt to a new transmission rate. Therefore, when transmitting the dummy data, the video transmit end may change the hardware clock based on the video parameter indication information in the video switching instruction, to finally change the transmission rate of the video stream.

In an optional implementation, before the video transmit end switches from the dummy data to the second video stream, the video transmit end further needs to receive a second switching control instruction fed back by the video receive end, where the second switching control instruction is used to notify the video transmit end that the video receive end is ready to receive the new video stream, and has a capability of displaying the second video stream. In this case, after receiving the second switching control instruction, the video transmit end detects whether the field blanking period of the second video stream arrives, and then completes switching from the dummy data to the second video stream after the field blanking period arrives.

In an optional implementation, the dummy data transmitted by the video transmit end to the video receive end is a pseudo-random code type. In this way, randomness of the dummy data can be ensured, so that a data type of the dummy data is closer to the original video stream. In this case, a link layer does not perceive the video switching process, and can continue to maintain the original link. In other words, video stream switching can be completed without disconnecting a video stream link, thereby accelerating the video switching process. In an optional implementation, the video transmit end further needs to perform content protection and encryption processing on the dummy data before sending the dummy data to the video receive end. When sending the video stream, the video transmit end performs content protection and encryption processing on the video stream, and the video transmit end and the video receive end each include an authentication mechanism. Therefore, performing content protection and encryption processing on the dummy data can make the dummy data closer to the video stream data, and the video receive end can complete data transmission without re-authenticating the dummy data, thereby accelerating the video switching process.

A second aspect of embodiments of this application provides another video switching method, including:

A video transmit end transmits a first video stream to a video receive end, and receives a video switching instruction when transmitting a first video frame, where the instruction instructs the video transmit end to switch to a new video stream. Before responding to the video switching instruction, the video transmit end first sends a switching request command to the video receive end, to notify the video transmit end that video switching is to be performed on the first video stream that is being transmitted, where the switching request command may include video parameter indication information and the like in the video switching instruction. In this case, the video receive end performs a switching preprocessing operation in advance based on the information in the switching request command. After a preprocessing procedure of the video receive end is completed, the video receive end feeds back a first switching control instruction to the video transmit end, and allows the video transmit end to perform data switching.

In the foregoing embodiment, before starting a video switching procedure, the video transmit end needs to notify the video receive end. In this way, the video receive end can prepare in advance and receive the new video stream, thereby accelerating switching of the entire video switching procedure and making a system more stable.

In an optional implementation, after receiving the switching request command, the video receive end further needs to perform a hardware adaptation operation. After completing the hardware video operation, the video receive end feeds back a second switching control instruction to the video transmit end. The second switching control instruction is used to notify the video transmit end that the video receive end is ready to receive the new video stream and has a capability of displaying the second video stream. In this case, after receiving the second switching control instruction, the video transmit end detects whether a field blanking period of the second video stream arrives, and then completes switching from the dummy data to the second video stream after the field blanking period arrives.

A third aspect of embodiments of this application provides a video transmit device, including:

a receiving unit, configured to receive a video switching instruction when sending a first video frame, where the first video frame is one frame of video data of a first video stream that is being sent; and a processing unit, configured to: when a first field blanking period after the first video frame arrives, switch video data in response to the video switching instruction.

In an optional implementation, the video switching instruction carries video parameter indication information; and the processing unit is specifically configured to: switch from the first video stream to dummy data in response to the video switching instruction, and send the dummy data to a video receive end; modify a video source parameter based on the video parameter indication information; switch from the dummy data to a second video stream in a second field blanking period of the second video stream, where the second video stream is a new video stream obtained after the video transmit device modifies the video source parameter; and send the second video stream to the video receive end in an active period after the second field blanking period.

In an optional implementation, the processing unit is further configured to perform hardware adaptation based on the video parameter indication information.

In an optional implementation, the video transmit device further includes a sending unit, where the sending unit is specifically configured to: send a switching request command to the video receive end after the receiving unit receives the video switching instruction;

the receiving unit is further configured to receive a first switching control instruction fed back by the video receive end; and the processing unit is further configured to: detect whether the first field blanking period arrives after the receiving unit receives the first switching control instruction, and switch from the first video stream to the dummy data in response to the video switching instruction when detecting that the first field blanking period arrives.

In an optional implementation, the first video stream and the second video stream correspond to different transmission rates, and the processing unit is specifically configured to: change a hardware clock based on the video parameter indication information when transmitting the dummy data, to change a transmission rate of the video stream.

In an optional implementation, before the processing unit modifies the video source parameter based on the video parameter indication information, the receiving unit is further configured to receive a switching control instruction sent by the video receive end; and the processing unit is specifically configured to: after the receiving unit receives the switching control instruction, modify the video source parameter based on the video parameter indication information, to obtain the second video stream; and perform the hardware adaptation based on the video parameter indication.

In an optional implementation, the dummy data is a pseudo-random code type.

In an optional implementation, the processing unit is further configured to perform content protection and encryption on the dummy data, and the sending unit is specifically configured to transmit the encrypted dummy data to the video receive end.

A fourth aspect of embodiments of this application provides a video receive device, including:

a receiving unit, configured to receive a switching request command sent by a video transmit end, where the switching request command is used to instruct the video transmit end to perform video switching on a first video stream that is being transmitted;

a processing unit, configured to perform a switching preprocessing operation according to the switching request command, where the switching preprocessing operation includes buffering a video frame of the first video stream received by the receiving unit and displaying the buffered video frame; and a sending unit, configured to send, by the video receive end, a first switching control instruction to the video transmit end after the switching preprocessing operation of the processing unit is completed, where the first switching control instruction indicates that the video transmit end is allowed to perform the video switching.

In an optional implementation, the processing unit is further configured to: perform a hardware adaptation operation according to the switching request command; and send a second switching control instruction to the video transmit end after the hardware adaptation operation is completed, where the second switching control instruction indicates that the video receive end has a capability of displaying a second video stream, and the second video stream is a target video stream for switching indicated in the switching request command.

A fifth aspect of embodiments of this application provides a video transmit device. The video transmit device includes a processor and an interface circuit. The processor receives or sends data through the interface circuit. The processor is configured to invoke program instructions stored in a memory, to implement the method according to any one of the first aspect to the implementations of the first aspect in embodiments of this application.

A sixth aspect of embodiments of this application provides a video receive device. The video receive device includes a processor and a memory, the processor and the memory are coupled, and the memory stores program instructions. When the program instructions stored in the memory are executed by the processor, the method according to any one of the second aspect to the implementations of the second aspect in embodiments of this application is implemented.

A seventh aspect of this application provides a video connection and playing system, including the video transmit device according to any one of the third aspect to the implementations of the third aspect, and the video receive device according to any one of the fourth aspect to the implementations of the fourth aspect. The video transmit device sends a first data stream to the video receive device.

An eighth aspect of this application provides a computer storage medium. The computer storage medium is configured to store computer software instructions used by the video transmit device or the video receive device, and the computer software instructions include programs designed for the video transmit device or the video receive device.

The video transmit device may be the video transmit device described in the third aspect.

The video receive device may be the video receive device described in the fourth aspect.

A ninth aspect of this application provides a chip or a chip system. The chip or the chip system includes at least one processor and a communication interface, and the communication interface and the at least one processor are interconnected through a line. The at least one processor is configured to run computer programs or instructions, to perform the video switching method described in any one of the first aspect to the possible implementations of the first aspect.

The communication interface in the chip may be an input/output interface, a pin, a circuit, or the like.

In a possible implementation, the chip or the chip system described above in this application further includes at least one memory, and the at least one memory stores instructions. The memory may be a storage unit inside the chip, for example, a register or a cache, or may be a storage unit outside the chip (for example, a read-only memory or a random access memory).

A tenth aspect of this application provides a chip or a chip system. The chip or the chip system includes at least one processor and a communication interface, and the communication interface and the at least one processor are interconnected through a line. The at least one processor is configured to run computer programs or instructions, to perform the video switching method described in any one of the second aspect to the possible implementations of the second aspect.

The communication interface in the chip may be an input/output interface, a pin, a circuit, or the like.

In a possible implementation, the chip or the chip system described above in this application further includes at least one memory, and the at least one memory stores instructions. The memory may be a storage unit inside the chip, for example, a register or a cache, or may be a storage unit outside the chip (for example, a read-only memory or a random access memory).

An eleventh aspect of this application provides a computer program product. The computer program product includes computer software instructions, and the computer software instructions may be loaded by using a processor to implement the procedure in the video switching method according to any one of the first aspect and the second aspect.

It can be learned from the foregoing technical solutions that this application has the following advantages:

In embodiments of this application, the video data switching process of the video transmit end occurs in the field blanking period, which can ensure that the video transmit end does not perform video switching in the video active period. In this way, video data transmission is not interrupted in the middle of the video frame. In other words, the video transmit end always sends the complete video frame to the video receive end. Therefore, the video receive end also displays the complete image corresponding to the complete video frame, thereby avoiding the phenomenon such as the screen tearing, the screen flickering, or the snowflake screen.

DETAILED DESCRIPTION OF ILLUSTRATIVE EMBODIMENTS

Figure 1:
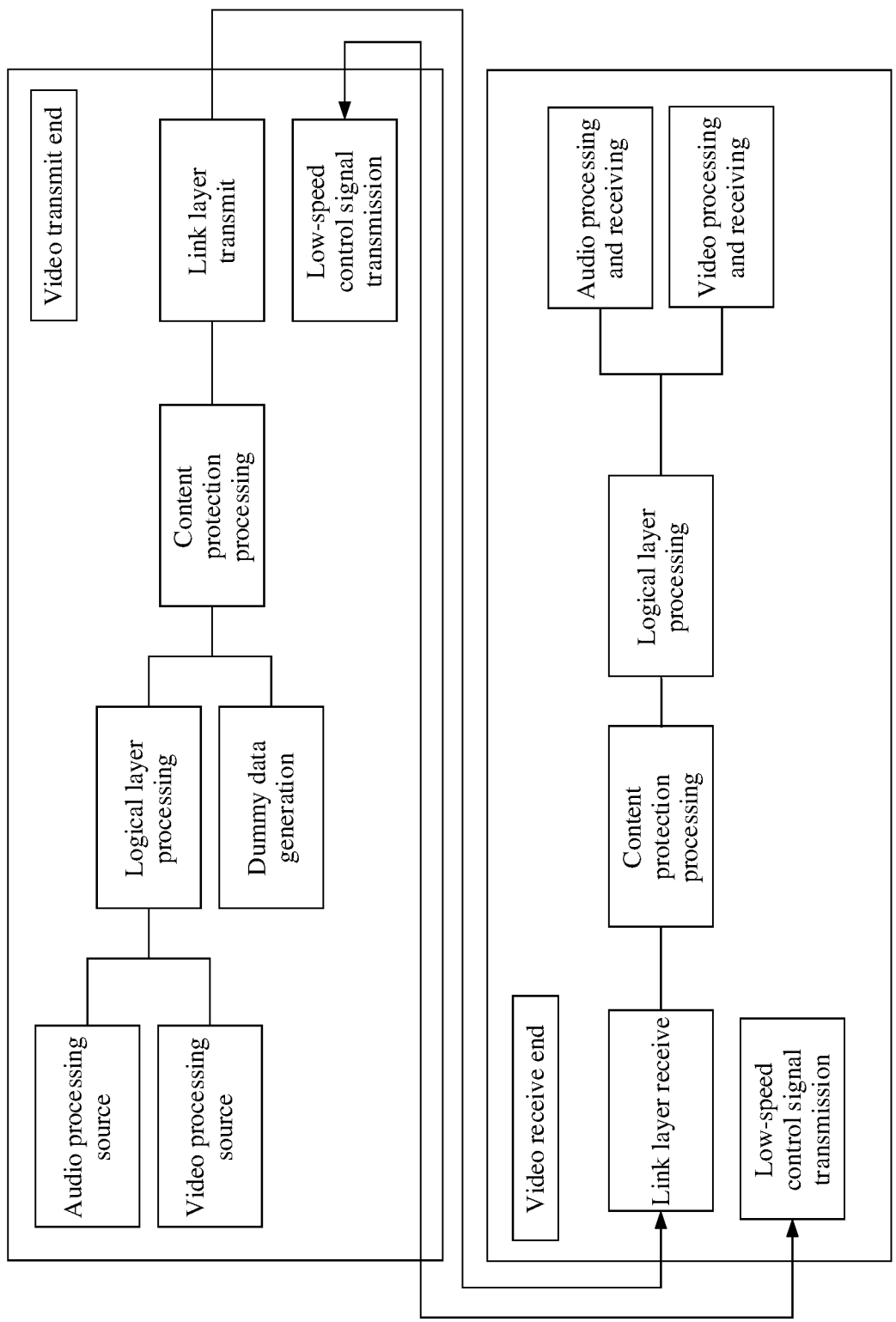
FIG. 1 is a diagram of a system architecture of a high-speed video connection and playing system according to an embodiment of this application.

Embodiments of this application provide a video switching method and a related device, to avoid a phenomenon such as screen tearing at a video receive end. In addition, a video transmit end can complete video switching without stopping a video transmission process, thereby shortening a video switching time in a high-speed media interface transmission process.

The following describes technical solutions in this application in detail with reference to accompanying drawings in this application. Apparently, the described embodiments are merely some rather than all of embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device. The following clearly and completely describes the technical solutions in embodiments of this application with reference to the accompanying drawings in embodiments of this application.

With continuous development of multimedia technologies, high-speed media connection and playing scenarios are increasingly extensive. Generally, an audio and video receive end (sink) and an audio and video transmit end (source) are connected through a high-speed media interface. The source transmits audio and video content to the sink, and then the sink displays the received audio and video content. For example, a high-definition television and a set-top box are connected through a high-speed multimedia interface. Audio and video data is transmitted from the set-top box to the high-definition television through a high-speed transmission line, and then played by a display screen of the high-definition television. In a process of playing a video on the television, a user may send, based on a requirement, an instruction for changing resolution of the original video, adjusting a high-dynamic range (HDR) parameter of the original video, or changing video content to the set-top box. Then, the set-top box adjusts a video transmit source parameter according to the instruction requirement, and switches an output of a video signal to finally implement video switching.

The audio and video data is transmitted in a manner of a video stream. The video stream includes a plurality of pieces of video frame data, and each video frame represents a complete image. In every two adjacent video frames, there is some other data that is not an image. The data is not used to display a video image, and the data includes a control signal for controlling video transmission, audio corresponding to the video, subtitle data, bullet comment data, special effect data, logo data, or the like. When a data transmit end transmits video source data through a media interface, a transmission time sequence of the video source data includes an active period and a blanking period.

In the active period, data transmitted by the data transmit end through the media interface is valid video data. Herein, the valid video data is image frame data of a transmitted video, namely, data that can be displayed on a display screen. For brief description, the valid video data is referred to as video data for short below.

Generally, an active period corresponding to the video data includes a plurality of row active periods. Any row active period in the plurality of row active periods is a time period for transmitting one row of video data in the video data. One row of video data corresponds to one row active period.

In the blanking period, data transmitted by the data transmit end through the media interface is invalid video data, in other words, the data transmitted in the blanking period cannot be displayed on the display screen. The data transmitted in the blanking period includes the control signal for controlling video transmission, the audio corresponding to the video, the subtitle data, the bullet comment data, the special effect data, the logo data, or the like.

Generally, the blanking period includes a row blanking period and a field blanking period.

The row blanking period may also be referred to as a horizontal blanking (Horizontal blanking) period. The row blanking period generally refers to a time period between two row active periods corresponding to two rows of video data. Alternatively, it may be understood that a time period after a row active period corresponding to a row of video data and before a row active period corresponding to a previous row or a next row of video data of the row of video data may be referred to as the row blanking period.

It may be understood that, in a process in which the data transmit end transmits the video data through the media interface, a plurality of row blanking periods are generated. It should be understood that duration of the plurality of row blanking periods may be the same or different.

The field blanking period may also be referred to as a vertical blanking (vertical blanking) period. The field blanking period generally refers to a time period between which the data transmit end separately transmits, through the media interface, video data corresponding to two image frames in the video. Generally, duration of the field blanking period is longer than duration of the row blanking period.

In a process of transmitting the video data, the source sequentially transmits a first video frame before transmitting data in a first field blanking period after the first video frame, transmits a second video frame before transmitting data in a second field blanking period after the second video frame, . . . , and the rest may be deduced by analogy. In a transmission process of each video frame, the source may sequentially transmit video pixel signals of each row of a complete image until all the pixel signals of the complete image are transmitted. To be specific, the field blanking period is used to transmit non-video image data between a last row of a previous video frame and a first row of a next video frame in the two adjacent video frames. An active period of the video stream is used to transmit data between a first row and a last row of each video frame.

It should be understood that the field blanking period may further be understood as a region of the non-image data between the last row of the previous video frame and the first row of the next video frame in the two adjacent video frames in the video stream. Correspondingly, the active period may also be understood as a region between a first row of video data to a last row of video data in any video frame.

In the conventional technology, after receiving a video instruction sent by a user, a source immediately shuts down a video stream that is being transmitted, and then obtains a new video stream according to the video instruction for transmission. If the source receives the video switching instruction when transmitting the video stream to an active period of a video frame, the source shuts down the video stream from a location at which the video switching instruction is received, and does not transmit video data to a sink before the new video stream is prepared. In this way, the source transmits an incomplete video frame to the sink. If the sink plays the received video data in real time, an incomplete frame of image is played before the new video stream arrives. Consequently, a phenomenon such as screen tearing, screen flickering, or a snowflake screen occurs, and compatibility problems such as abnormal sound may occur.

Based on the foregoing problem, an embodiment of this application provides a new video switching method. In a video switching process, a source does not shut down a video stream, and controls a video switching point to be in a field blanking period by sending dummy data to a sink. In this way, video data received by the sink is always a complete video frame, thereby avoiding a phenomenon such as screen tearing. A related interaction instruction is transmitted between the source and the sink through a low-speed transmission link, and the video stream is transmitted through a high-speed interface.

The following describes in detail the method provided in embodiments of this application with reference to specific accompanying drawings. FIG. 1 is a diagram of a system architecture of a high-speed video connection and playing system according to an embodiment of this application. As shown in FIG. 1, the system includes an audio and video transmit end (source) and an audio and video receive end (sink). Each of the source and sink includes a logical layer processing module, a dummy data generation module, a content protection processing module (optional), a link layer processing module, and a low-speed control signal transmission module. The source includes an audio processing source module and a video processing source module, and a link layer processing module of the source is a link layer sending module. The sink includes an audio processing and receiving module and a video processing and receiving module, and a link layer processing module of the sink is a link layer receiving module. A channel between the low-speed control signal transmission units of the source and the sink is referred to as a sideband, and the sideband may also be referred to as a low-speed transmission link.

The link layer transmission module of the source and the link layer processing module of the sink are connected through a high-speed transmission line. In addition, each of the source and the sink includes the low-speed control signal transmission unit, configured to transmit a related low-speed interaction instruction. The audio processing source module and the video processing source module of the source are configured to receive audio and video content from a server. The logical layer processing unit is configured to pack or unpack audio and video data, and integrate or split the data based on a transmission protocol. The dummy data generation module is configured to generate dummy data to connect with valid audio and video data. The content protection unit is an optional unit, and performs encryption and decryption processing on the video data for transmission. The link layer processing unit is configured to encode and scramble the video data.

Figure 2:
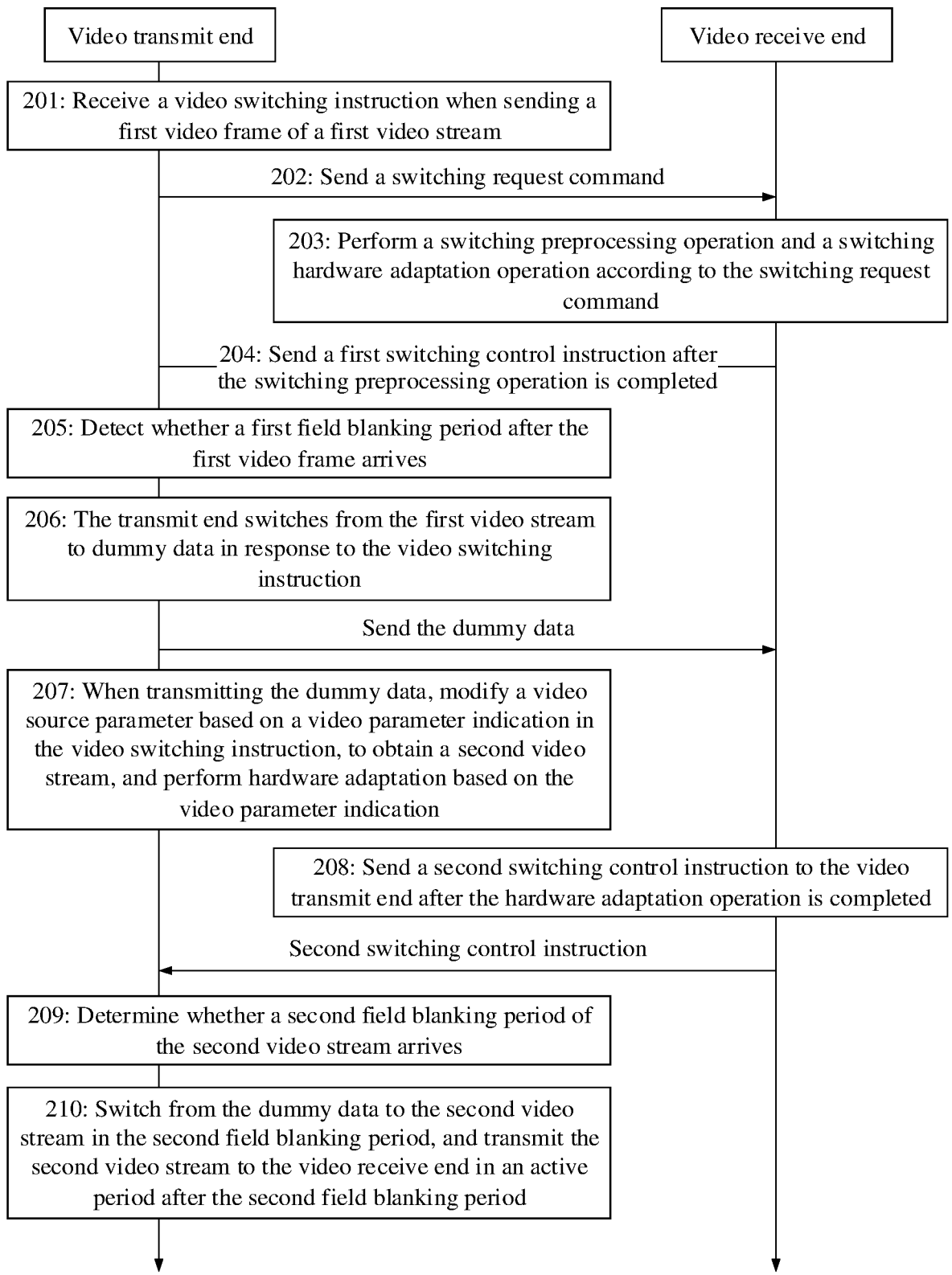
FIG. 2 is a schematic flowchart of a video switching method according to an embodiment of this application.

Based on the foregoing high-speed video connection and playing system, FIG. 2 is a schematic flowchart of a video switching method according to an embodiment of this application. As shown in FIG. 2, the video switching method includes the following steps.

201: A video transmit end receives a video switching instruction when sending a first video frame of a first video stream.

The video transmit end transmits video data to a video receive end in a manner of a video stream, and then the video receive end displays the received video data. Specifically, the video transmit end transmits a complete video frame in an active period, where each video frame corresponds to a complete video image, and transmits other non-image data in a field blanking period.

In a video transmission process, the video transmit end receives the video switching instruction sent by a user at any time. The video switching instruction is used to switch the video stream for transmission. For example, the video switching instruction instructs the video transmit end to change a video parameter of the original video stream, including increasing or decreasing resolution, an HDR, a color depth, or the like of the original video. Alternatively, content of the video stream may be changed as required. In other words, the video transmit end is required to send new video stream data. In this case, the video transmit end needs to obtain and switch to a new video stream based on various requirements in the video switching instruction, and send the new video stream to the video receive end.

Specifically, a time at which the user sends the video switching instruction is uncertain, in other words, the video transmit end may receive the video switching instruction when transmission is performed in the active period of the first video stream, or may receive the video switching instruction when transmission is performed in the blanking period. When the video transmit end receives the video switching instruction when the blanking period arrives, all video streams transmitted by the video transmit end to the video receive end are complete video frames. In this case, the video transmit end may directly switch to the second video stream. When the video transmit end receives the video switching instruction in the middle of transmitting a video frame (the first video frame) of the first video stream, the video transmit end cannot immediately perform switching. Otherwise, the video transmit end interrupts transmission when transmission of the complete video frame is not completed, which causes screen tearing.

202: The video transmit end sends a switching request command to the video receive end.

The switching request command is used to notify the video receive end that video switching is to be performed. For example, the switching request command may indicate a parameter requirement in the video switching instruction. To be specific, the switching request command may include the to-be-modified video parameter, for example, the data such as the resolution, the HDR, or the color depth. In this way, the video receive end may know a switching status of the video stream in advance, and perform related preparation work. For example, the switching request command may be communicated through a low-speed control information transmission module. It should be understood that the video transmit end sends the switching request command to the video receive end by using a sideband.

203: The video receive end executes a switching preprocessing operation and a switching hardware adaptation operation according to the switching request command sent by the video transmit end.

After receiving the switching request command, the video receive end may perform the preprocessing operation and the hardware adaptation operation based on an indication in the switching request command. For example, the preprocessing operation may be buffering the video data in the received first video stream, and then selecting a complete video frame from the buffered data for display, to avoid displaying an incomplete video frame. It should be understood that the video receive end always displays the buffered video frame in a process in which the video transmit end performs video switching until the second video stream to be switched to is received. Generally, the video switching process lasts for a very short time. For example, only a time used to display one video frame may be occupied. Therefore, video frame freezing does not occur when the buffered video frame is displayed. For example, the switching preprocessing operation may further include an operation such as changing a preprocessing flow control parameter based on a parameter in the switching request command to accelerate a display speed of the new video stream, and the like. This is not specifically limited. The hardware adaptation operation is that the video receive end performs hardware adaptation based on a video parameter of the video stream to be switched to, to make hardware ready for displaying the new video stream. For example, if a transmission rate of the new video stream changes, the video receive end needs to change a hardware clock, to ensure that a hardware clock of the video transmit end is the same as that of the video receive end.

204: Send a first switching control instruction to the video transmit end after the switching preprocessing operation of the video receive end is completed.

After completing the switching preprocessing operation, the video receive end may send the first switching control instruction to the video transmit end, to indicate that the video receive end can perform an action of video switching and start to display the buffered video frame. Optionally, the video receive end may directly respond to the switching request command, and feed back the first switching control instruction to the video transmit end. Optionally, the video transmit end may further poll the video receive end to actively detect a preparation status of the video receive end. It should be understood that the video receive end feeds back the first switching control instruction by using the sideband, or the video transmit end actively queries the switching preparation status of the video receive end by using the sideband.

If the video transmit end polls the video receive end for a plurality of times and finds out that the switching preprocessing operation of the receive end is not completed, and a quantity of polling times exceeds a configured threshold, the video transmit end may consider that the video receive end is abnormal and does not support switching to the new video stream. In this case, the video transmit end can return to decision-making layer processing of the video transmit end and report a modification failure for subsequent processing. If the video transmit end polls and finds out that the preprocessing of the video receive end is completed, or the video receive end notifies the video transmit end that the preparation is completed, in other words, after the video transmit end obtains success indication information, the video transmit end may start a video switching procedure to perform the video switching operation. It should be understood that the video receive end sends the first switching control instruction to the video transmit end by using the sideband.

205: The video transmit end detects whether the first field blanking period after the first video frame arrives; and if yes, perform step 206; or if no, continue to perform step 205.

When the video transmit end receives the video switching instruction when sending the first video frame, the video transmit end needs to wait for arrival of the first field blanking period after the first video frame. Specifically, each video frame in the video stream represents a complete image frame, and each complete image is formed by scanning lines. When displaying the video stream data, the video receive end also sequentially displays the video stream data from top to bottom, one row after another, along a display screen. Data in the field blanking period does not need to be displayed. Therefore, even if the transmit end receives the video switching instruction in the middle of transmitting a video frame, the transmit end still needs to respond to the video switching instruction to perform video switching after a field blanking period after the video frame arrives. In this way, it can be ensured that the complete video frame is transmitted to the video receive end, thereby avoiding transmitting only a part of pixel signals of one video frame.

206: The video transmit end switches from the first video stream to dummy data in response to the video switching instruction, and sends the dummy data to the video receive end.

If the first field blanking period after the first video frame arrives, the video transmit end may perform video switching. Because the video transmit end needs time to obtain the new video stream, in the process of performing video switching, the video transmit end first switches to the dummy data, and transmits the dummy data to the video receive end. Then, in a process of transmitting the dummy data, the new video stream is prepared for transmission.

Specifically, the dummy data sent by the video transmit end may be a pseudo-random code type processed by using a scramble algorithm, thereby improving randomness of the dummy data. The video transmit end may further perform content protection and encryption processing on the dummy data, and then transmit the data. The purpose is to ensure that data types of the dummy data and the video stream data are as consistent as possible, so that the video stream does not need to be shut down, and a link layer and the video receive end do not sense data switching. In this way, a clock and data recovery (clock and data recovery, CDR) technology and a continuous time linear equalization (continuous time linear equalization, CTLE) technology can be kept stable to accelerate the switching procedure.

When sending the video stream to the video receive end, the video transmit end needs to perform content encryption and protection processing on the video stream. After receiving the video stream, the video receive end needs to perform authentication on the video frame, and then decrypt the video stream before playing. Therefore, the dummy data is transmitted after content protection and encryption processing, so that a content protection processing module does not sense video switching, and an authentication mechanism does not need to be re-established, thereby further accelerating video switching.

207: When transmitting the dummy data, the video transmit end modifies a video source parameter based on the video parameter indication in the video switching instruction, to obtain the second video stream, and performs the hardware adaptation based on the video parameter indication.

The video transmit end obtains the new video stream based on the video parameter indication in the video switching instruction. Specifically, the video transmit end modifies the video source parameter based on the video parameter indication, for example, switches a video whose resolution is 1080p to a video whose resolution is 4k.

Figure 3:
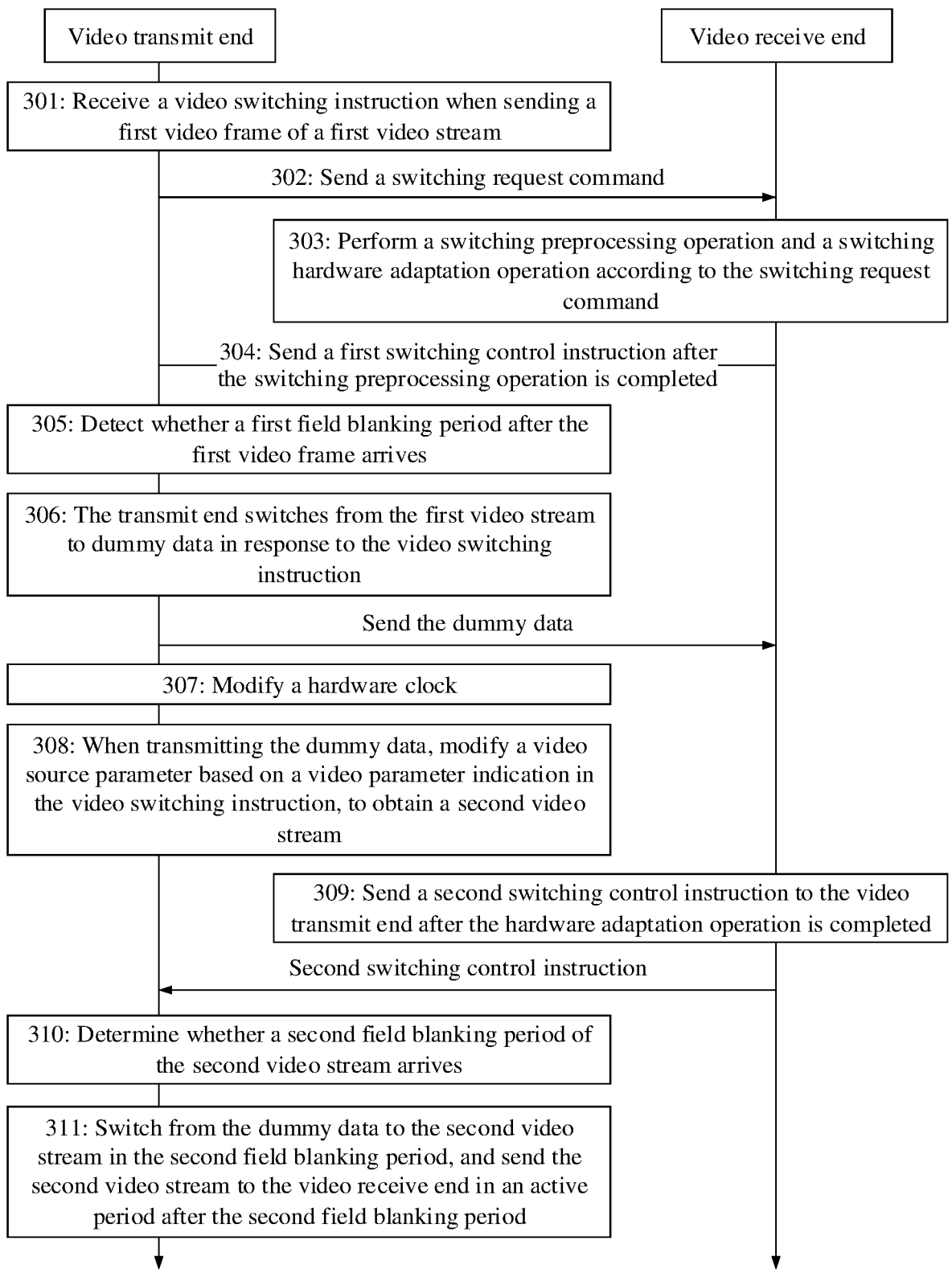
FIG. 3 is a schematic flowchart of another video switching method according to an embodiment of this application.
Figure 4:
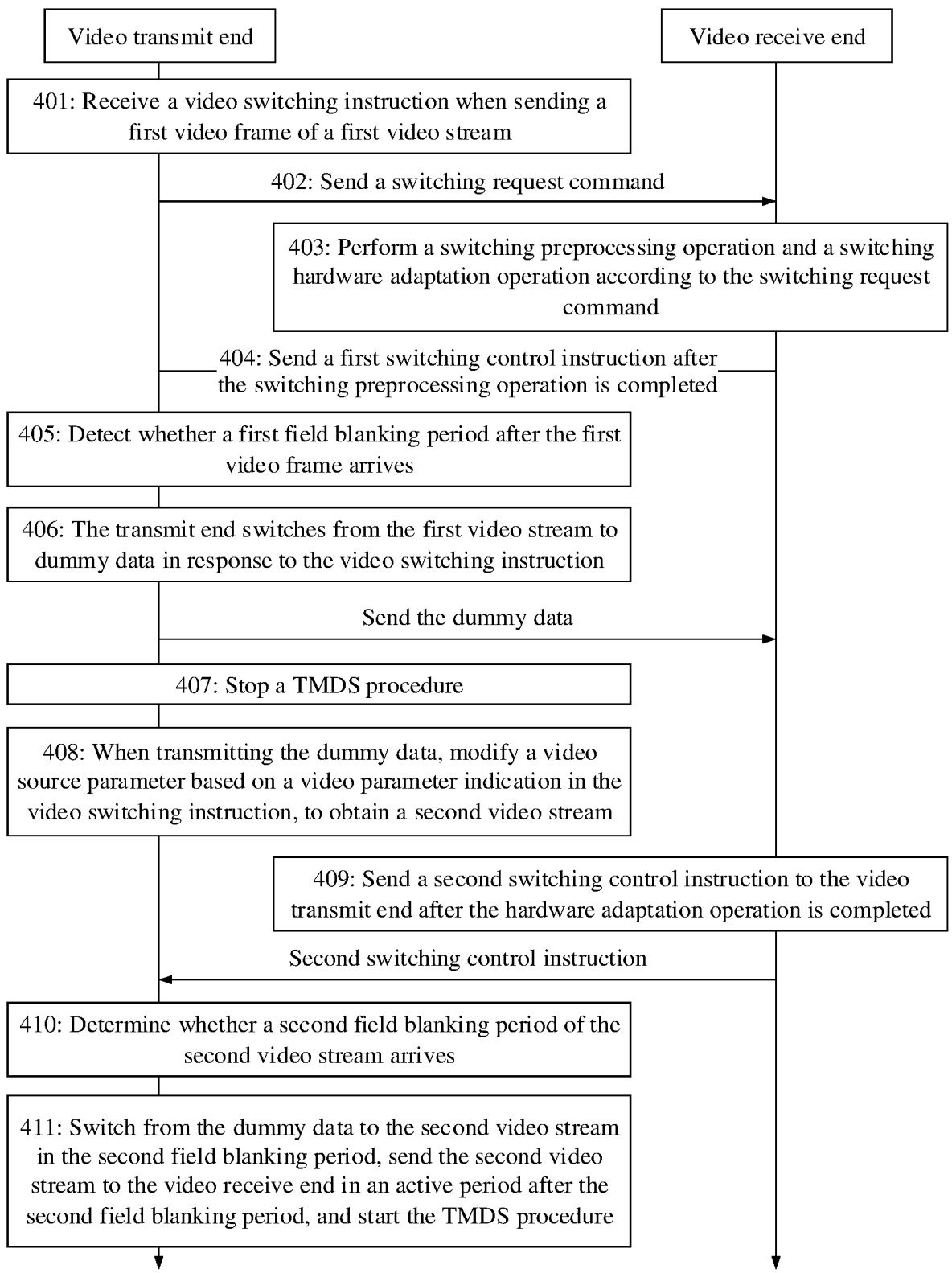
FIG. 4 is a schematic flowchart of another video switching method according to an embodiment of this application.

The video transmit end further needs to perform hardware adaptation of a video source module, for example, when the hardware clock of the new video stream changes. To be specific, when the transmission rate of the first video stream and the transmission rate of the second video stream are fixed, but the transmission rates are different, the hardware clock needs to be changed. For example, when the transmission rate of the video stream that needs to be switched changes, the video transmit end may execute a procedure of the video switching method shown in FIG. 3. Other steps shown in FIG. 3 are respectively the same as corresponding steps in the embodiment shown in FIG. 2, and details are not described herein again. Step 307 is used to modify the hardware clock, to be specific, when the video transmit end sends the dummy data to the video receive end, the hardware clock of the transmit end may be modified. For example, modifying the hardware clock includes completing a link clock domain modification, to change the transmission rate of the video stream. It is convenient to subsequently transmit the second video stream to be switched to in a new transmission mode. It may be understood that modifying the hardware clock is an example of performing hardware adaptation. For example, this embodiment of this application may be further applied to a high-speed interface scenario with an unfixed transmission rate. For example, in a minimized differential signaling (transition-minimized differential signaling, TMDS) transmission protocol, a transmission rate of an interface between the video transmit end and the video receive end is not fixed. When a TMDS procedure is started, a TMDS clock frequency changes with a character rate. Because a character rate of the new video stream is different from that of the original video stream, to avoid a compatibility problem, the TMDS procedure may be disabled first, and dummy data is transmitted at a fixed rate. When the second data stream is to be sent, the TMDS procedure is restarted. FIG. 4 is a flowchart of a video switching method in the application scenario. In this scenario, after dummy data is switched to, the method embodiment further includes step 407: stopping the TMDS procedure. Other steps shown in FIG. 4 are respectively the same as corresponding steps in the embodiment shown in FIG. 2, and details are not described herein again. When the second video stream to be switched to is subsequently transmitted, the TMDS procedure may be restarted.

208: The video receive end sends a second switching control instruction to the video transmit end after completing the hardware adaptation operation.

In the foregoing steps, when receiving the switching request command, the video receive end further needs to perform the hardware adaptation operation. For example, after receiving the hardware adaptation operation, the video receive end needs to send the second switching control instruction to the video transmit end, to notify the video receive end that the video receive end has made hardware preparation for receiving the new video stream and has a capability of displaying the second video stream. In this way, the video transmit end can perform switching of the second video stream according to the second switching control instruction.

209: The video transmit end determines whether a second field blanking period of the second video stream arrives; and if yes, perform step 210; or if no, perform step 209.

When the video transmit end prepares the second video stream, the video transmit end needs to switch from the dummy data to the second video stream. Initial data of the second video stream starts from the middle of the first video frame at which the video switching instruction is received. Therefore, to ensure that all the video data sent by the video transmit end to the video receive end is the complete video frames, the video transmit needs to wait for arrival of the field blanking period of the second video stream. In addition, switching is performed in the field blanking period of the second video stream, so that no incomplete video frame is transmitted to the video receive end. It should be understood that, if video parameter modification and hardware adaptation are not completed when the video transmit end receives the second switching control instruction sent by the video receive end, the video transmit end detects whether the second field blanking period arrives after completing the video parameter modification and the hardware adaptation.

210: The video transmit end switches from the dummy data to the second video stream in the second field blanking period, and sends the second video stream to the video receive end in an active period after the second field blanking period.

Specifically, after the field blanking period of the second video frame arrives, data switching is completed in the field blanking period. In addition, the video transmit end transmits the second video stream to the video receive end in the active period after the field blanking period, and then continues to transmit a subsequent video stream.

Figure 5:
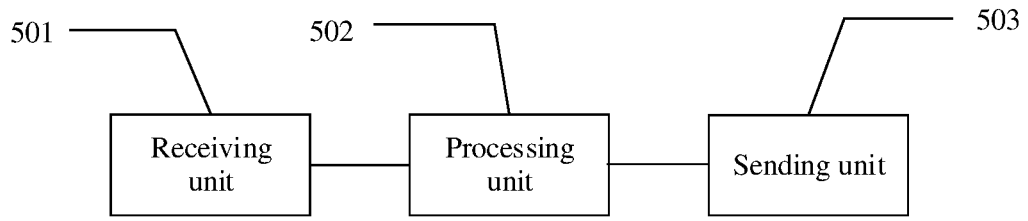
FIG. 5 is a schematic diagram of a structure of a video transmit device according to an embodiment of this application.

FIG. 5 is a schematic diagram of a structure of a video transmit device according to an embodiment of this application. As shown in FIG. 5, the video transmit device includes: a receiving unit 501, configured to receive a video switching instruction when sending a first video frame, where the first video frame is one frame of video data of a first video stream that is being sent; and a processing unit 502, configured to: when a first field blanking period after the first video frame arrives, switch video data in response to the video switching instruction.

In an optional implementation, the video switching instruction carries video parameter indication information; and the processing unit 502 is specifically configured to: switch from the first video stream to dummy data in response to the video switching instruction, and send the dummy data to a video receive end; modify a video source parameter based on the video parameter indication information; switch from the dummy data to a second video stream in a second field blanking period of the second video stream, where the second video stream is a new video stream obtained after the video transmit end modifies the video source parameter; and send the second video stream to the video receive end in an active period after the second field blanking period.

In an optional implementation, the processing unit 502 is further configured to perform hardware adaptation based on the video parameter indication information.

In an optional implementation, the video transmit device further includes a sending unit 503, where the sending unit 503 is specifically configured to: send a switching request command to the video receive end after the receiving unit 301 receives the video switching instruction; the receiving unit 501 is further configured to receive a first switching control instruction fed back by the video receive end; and the processing unit 502 is further configured to: detect whether the first field blanking period arrives after the receiving unit 501 receives the first switching control instruction, and switch from the first video stream to the dummy data in response to the video switching instruction when detecting that the first field blanking period arrives.

In an optional implementation, the first video stream and the second video stream correspond to different transmission rates, and the processing unit 502 is specifically configured to: change a hardware clock based on the video parameter indication information when transmitting the dummy data, to change a transmission rate of the video stream.

In an optional implementation, before the processing unit 502 modifies the video source parameter based on the video parameter indication information, the receiving unit 501 is further configured to receive the switching control instruction sent by the video receive end; and the processing unit 502 is specifically configured to: after the receiving unit 501 receives the switching control instruction, modify the video source parameter based on the video parameter indication information, to obtain the second video stream; and perform the hardware adaptation based on the video parameter indication information.

In an optional implementation, the dummy data is a pseudo-random code type.

In an optional implementation, the processing unit 502 is further configured to perform content protection and encryption on the dummy data; and the sending unit 503 is specifically configured to transmit the encrypted dummy data to the video receive end.

Figure 6:
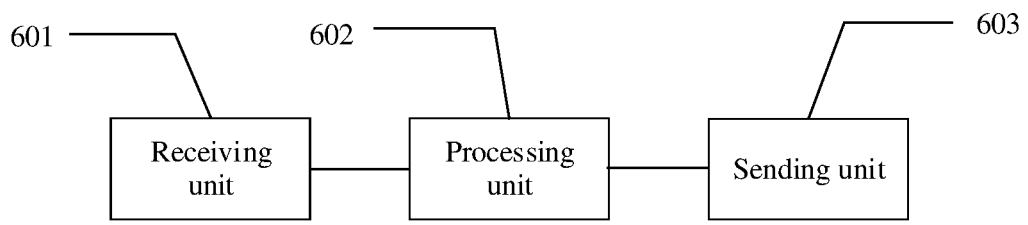
FIG. 6 is a schematic diagram of a structure of a video receive device according to an embodiment of this application.

FIG. 6 is a schematic diagram of a structure of a video receive device according to an embodiment of this application. As shown in FIG. 6, the video receive device includes: a receiving unit 601, configured to receive a switching request command sent by a video transmit end, where the switching request command is used to instruct the video transmit end to perform video switching on a first video stream that is being transmitted; a processing unit 602, configured to perform a switching preprocessing operation according to the switching request command, where the switching preprocessing operation includes buffering a video frame of the first video stream received by the receiving unit 601 and displaying the buffered video frame; and a sending unit 603, configured to send, by the video receive end, a first switching control instruction to the video transmit end after the switching preprocessing operation of the processing unit 602 is completed, where the first switching control instruction indicates that the video transmit end is allowed to perform the video switching.

In an optional implementation, the processing unit 602 is further configured to: perform a hardware adaptation operation according to the switching request command; and send a second switching control instruction to the video transmit end after the hardware adaptation operation is completed, where the second switching control instruction indicates that the video receive device has a capability of displaying a second video stream, and the second video stream is a target video stream for switching indicated in the switching request command.

Figure 7:
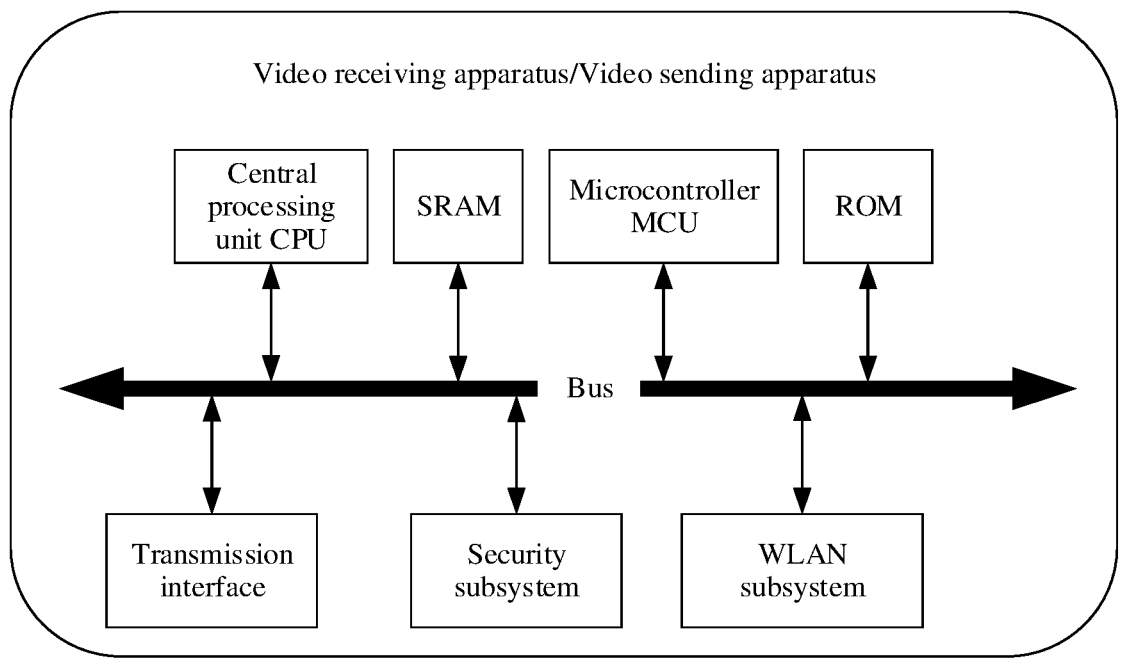
FIG. 7 is a schematic diagram of a structure of another video transmit device or video receive device according to an embodiment of this application.

FIG. 7 is a diagram of a hardware architecture of a video transmit device or a video receive device. This diagram may indicate a hardware structure of a processor chip of the video transmit device or the video receive device. As shown in FIG. 7, the video transmit device or the video receive device includes at least one CPU and a memory. Types of the memory may include, for example, an SRAM, a ROM, a microcontroller (Microcontroller Unit, MCU), a security subsystem, a WLAN subsystem, a bus, and a transmission interface. Although not shown in FIG. 7, the video transmit device or the video receive device may further include other dedicated processors such as an application processor (AP) and an NPU, and other subsystems such as a power management subsystem, a clock management subsystem, and a power consumption management subsystem.

The foregoing parts of the video transmit device or the video receive device are coupled through a connector. For example, the connector includes various interfaces, transmission lines, or buses. These interfaces are usually electrical communication interfaces, but may alternatively be mechanical interfaces or interfaces in another form. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other through one or more buses. In an optional case, the CPU invokes program instructions stored in an on-chip memory or an off-chip memory to implement any wireless screen projection method in the foregoing method embodiments. In an optional case, the CPU and the MCU jointly implement any wireless projection method in the foregoing method embodiments. For example, the CPU completes some steps in the wireless projection method, and the MCU completes other steps in the wireless projection method. In an optional case, the AP or another dedicated processor invokes the program instructions stored in the on-chip memory or the off-chip memory to implement any wireless screen projection method in the foregoing method embodiments.

The transmission interface may be an interface of the processor chip for receiving and sending data. The transmission interface usually includes a plurality of interfaces. In an optional case, the transmission interface may include an internal-integrated circuit (I2C) interface, a serial peripheral interface (SPI), a universal asynchronous receiver-transmitter (UART) interface, a general-purpose input/output (GPIO) interface, and the like. It should be understood that these interfaces may implement different functions by multiplexing a same physical interface.

In an optional case, the transmission interface may further include a high-definition multimedia interface (HDMI), a V-By-One interface, an embedded display port (eDP), a mobile industry processor interface (MIPI), a display port (DP), or the like.

In an optional case, the foregoing parts are integrated on a same chip. In another optional case, the memory may be an independent chip.

The security subsystem may be configured to implement an encryption algorithm related to security authentication. It should be understood that the encryption algorithm related to security authentication is usually implemented by hardware, so that security of the encryption algorithm can be further improved.

The WLAN subsystem may include, for example, an RF circuit and a baseband.

An embodiment of this application further provides a computer storage medium. The computer storage medium stores computer program instructions that implement a function of a video transmit end in the video switching method provided in embodiments of this application.

An embodiment of this application further provides a computer storage medium. The computer storage medium stores computer program instructions that implement a function of a video receive end in the video switching method provided in embodiments of this application.

An embodiment of this application further provides a computer program product.

The computer program product includes computer software instructions. The computer software instructions may be loaded by using a processor to implement the procedure in the video switching method shown in FIG. 2.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method, comprising:
   receiving, by a video transmit end, a video switching instruction when sending a first video frame, wherein the first video frame is a frame of video data of a first video stream that is being sent by the video transmit end, and wherein the video switching instruction carries video parameter indication information; and
   when a first field blanking period after the first video frame arrives, switching, by the video transmit end, video data in response to receiving the video switching instruction, comprising:
      switching, by the video transmit end, from the first video stream to dummy data in response to receiving the video switching instruction, and sending the
dummy data to a video receive end;
modifying, by the video transmit end, a video source
parameter based on the video parameter indication
information while sending the dummy data;
switching, by the video transmit end, from the dummy
data to a second video stream in a second field
blanking period of the second video stream, wherein
the second video stream is a new video stream
obtained after the video transmit end modifies the
video source parameter; and
sending, by the video transmit end, the second video
stream to the video receive end in an active period
after the second field blanking period.

2. The method according to claim 1, wherein during sending of the dummy data, the method further comprises:
performing, by the video transmit end, hardware adaptation based on the video parameter indication information.

3. The method according to claim 2, wherein the first video stream and the second video stream correspond to different transmission rates, and performing, by the video transmit end, the hardware adaptation based on the video parameter indication information comprises:
changing, by the video transmit end, a hardware clock based on the video parameter indication information when the video transmit end transmits the dummy data, to change a transmission rate of the dummy data.

4. The method according to claim 1, further comprising:
sending, by the video transmit end, a switching request command to the video receive end after the video transmit end receives the video switching instruction;
receiving, by the video transmit end, a first switching control instruction fed back by the video receive end; and
detecting, by the video transmit end after receiving the first switching control instruction, whether the first field blanking period arrives, and switching, by the video transmit end, from the first video stream to the dummy data in response to the video switching instruction when detecting that the first field blanking period arrives.

5. The method according to claim 1, wherein before switching, by the video transmit end, from the dummy data to the second video stream in the second field blanking period, the method further comprises:
receiving, by the video transmit end, a second switching control instruction sent by the video receive end; and
after the video transmit end receives the second switching control instruction, detecting, by the video transmit end, the second field blanking period, and switching from the dummy data to the second video stream in the second field blanking period.

6. The method according to claim 1, wherein the dummy data is pseudo-random code type data.

7. The method according to claim 1, further comprising:
performing, by the video transmit end, content protection and encryption on the dummy data, to obtain encrypted dummy data; and
wherein transmitting, by the video transmit end, the dummy data to the video receive end comprises:
transmitting, by the video transmit end, the encrypted dummy data to the video receive end.

8. The method according to claim 1, wherein the first field blanking period carries non-video image data in the first video stream.

9. A method, comprising:
receiving, by a video receive end, a switching request command sent by a video transmit end, wherein the switching request command notifies the video receive end video switching on a first video stream that is being transmitted will be performed;
performing, by the video receive end, a switching preprocessing operation and a hardware adaptation operation in response to receiving the switching request command, wherein the switching preprocessing operation comprises buffering a video frame of the received first video stream and displaying the buffered video frame;
sending, by the video receive end, a first switching control instruction to the video transmit end after the switching preprocessing operation is completed, wherein the first switching control instruction indicates that the video transmit end is allowed to perform the video switching; and
sending, by the video receive end, a second switching control instruction to the video transmit end after the video receive end completes the hardware adaptation operation, wherein the second switching control instruction indicates that the video receive end has a capability of displaying a second video stream, and the second video stream is a target video stream for switching indicated in the switching request command.

10. The method according to claim 9, wherein performing, by the video receive end, the switching preprocessing operation further comprises:
selecting a complete video frame from buffered video data for display.

11. The method according to claim 9, wherein performing, by the video receive end, the switching preprocessing operation further comprises:
changing a preprocessing flow control parameter based on a parameter in the switching request command.

12. The method according to claim 9, wherein performing, by the video receive end, the hardware adaptation operation comprises changing a hardware clock.

13. A video transmit device, comprising:
a receiver, configured to receive a video switching instruction when sending a first video frame, wherein the first video frame is a frame of video data of a first video stream that is being sent, and wherein the video switching instruction carries video parameter indication information; and
at least one processor, configured to:
when a first field blanking period after the first video frame arrives, switch video data in response to the video switching instruction, comprising:
switching from the first video stream to dummy data in response to receiving the video switching instruction, and sending the dummy data to a video receive end;
modifying a video source parameter based on the video parameter indication information while sending the dummy data;
switching from the dummy data to a second video stream in a second field blanking period of the second video stream, wherein the second video stream is a new video stream obtained after the video transmit device modifies the video source parameter; and
sending the second video stream to the video receive end in an active period after the second field blanking period.

14. The video transmit device according to claim 13, wherein the at least one processor is further configured to perform hardware adaptation based on the video parameter indication information.

15. The video transmit device according to claim 14, wherein the first video stream and the second video stream correspond to different transmission rates, and the at least one processor is configured to:
change a hardware clock based on the video parameter indication information when transmitting the dummy data, to change a transmission rate of the dummy data.

16. The video transmit device according to claim 13, further comprising:
a transmitter, configured to: send a switching request command to the video receive end after the receiving the video switching instruction;
wherein the receiver is further configured to receive a first switching control instruction fed back by the video receive end; and
wherein the at least one processor is further configured to:
detect whether the first field blanking period arrives after receiving the first switching control instruction, and switch from the first video stream to the dummy data in response to receiving the video switching instruction when detecting that the first field blanking period arrives.

17. The video transmit device according to claim 13, wherein the receiver is further configured to:
before switching from the dummy data to the second video stream in the second field blanking period, receive a second switching control instruction sent by the video receive end; and
wherein the at least one processor is further configured to:
after receiving the second switching control instruction, detect the second field blanking period, and switch from the dummy data to the second video stream in the second field blanking period.

18. The video transmit device according to claim 13, wherein the dummy data is pseudo-random code type data.

19. The video transmit device according to claim 13, further comprising:
a transmitter;
wherein the at least one processor is further configured to perform content protection and encryption on the dummy data, to obtain encrypted dummy data; and
wherein the transmitter is configured to transmit the encrypted dummy data to the video receive end.

20. The video transmit device according to claim 13, wherein the first field blanking period carries non-video image data in the first video stream.

* * * * *